United States Patent Office 3,051,663
Patented Aug. 28, 1962

3,051,663
COMPOSITION COMPRISING A POLYMER OF AN ETHYLENIC MONOMER AND A SALT OF AN ESTER OF A CARBOXYLIC ACID AND HYDROXYALKYLATED ALKYLENE POLYAMINE
Myron A. Coler, 56 Secor Road, Scarsdale, N.Y., and Arnold S. Louis, 5450 Mosholu Ave., Riverdale, N.Y.
No Drawing. Filed Mar. 30, 1956, Ser. No. 574,956
9 Claims. (Cl. 252—500)

This invention relates to improved synthetic resin molding compositions and methods of making same and, in particular, to such molding materials which avoid the highly undesirable effects of electrostatic charge build-up during the molding operation.

This application is a continuation-in-part of our co-pending application entitled "Non-Electrostatic Molding Compositions," Serial Number 556,405, filed December 30, 1955, and assigned to the assignee of this application and which application was abandoned in favor of the present application.

It has been found that the process of molding certain synthetic resins causes the generation of high electrostatic charges. This evidences itself frequently by the formation of "crow's-feet," "fern-like" and "zig-zag" patterns through the attraction of fine dust particles from the atmosphere. Such patterns are sometimes erroneously interpreted as being molding flaws.

The literature discloses many additives for rendering synthetic resins destaticized. Many of such additives depend on the property of deliquescence to cause the article to be wetted by moisture from the air. The moisture renders the surfaces of the article sufficiently conductive to prevent the further accumulation of electrostatic charges. Molding operations are normally carried out at temperatures substantially in excess of the boiling point of water and, therefore, as molded, the molded article is relatively moisture-free and thus subject to the accumulation of electrostatic charges at the time of molding.

Still other prior known additives which are inherently destaticizing agents tend to undesirably affect the physical properties of the plastic. For example, a lowering of the heat distortion point may occur. There may also be a change in color, gloss, hardness or water absorption characteristics, or blemishes may result from decomposition of additives or evaporation of low boiling fractions. The resulting product may also become toxic if the additive is in itself toxic.

Our invention, disclosed hereinafter, provides a plastic composition which avoids the disadvantages of acquiring electrostatic charges and, in particular, which is not susceptible to electrostatic charging during the molding operation or upon release from the mold.

This invention does not depend on deliquescent action and, therefore, produces results substantially independent of humidity. This advantage of the invention is important in the elimination of the tendency for dust patterns to form on freshly molded plastic articles.

We have found that the acid salts and quaternary ammonium salts of certain esters of hydroxyalkylated polyamines may be incorporated into synthetic resin molding compositions to provide anti-static properties.

A totally unexpected advantage of the above named group of additives was discovered during molding tests of material prepared in accordance with this invention. It was found that the additives disclosed hereinafter improved flow properties of the base plastic so as to permit shorter molding cycles as well as improved filling of thin mold sections; reduced breakage of thin-walled moldings and easier mold release were obtained.

An object of this invention is, therefore, to provide a method for eliminating the formation of electrostatic charges on molded plastic articles.

Another object is to provide a plastic molding composition having improved molding properties.

Still another object is to provide a plastic molding composition having preferred flow properties when injection molded.

A particular object is to provide a plastic material which is substantially non-susceptible to acquiring electrostatic charges.

A particular object of this invention is to provide a method for eliminating the formation of electrostatic charges on molded plastic articles during and especially immediately after the molding operation.

Another object is to provide articles comprising polystyrene compositions which are free of the effects of electrostatic charges.

Still another object of this invention is to provide an improved plastic composition and methods of making same.

A still different object is to reduce the electrostatic charge on polystyrene objects made by injection moldings.

A further object of this invention is to provide a polystyrene composition of superior molding properties.

Further objects and advantages will become apparent and still others will be pointed out with particularity as the following detailed description proceeds.

The esters whose acid salts and quaternary ammonium salts may be employed in the practice of this invention are those resulting from the esterification with alkyl carboxylic acid groups (containing no more than 4 carbon atoms) of one or more hydroxyalkyl groups of totally or partially hydroxyalkylated polyamines.

Thus the alkyl carboxylic acid esters of the following diamines may be employed:

Monohydroxyalkylated alkylene diamine
Di-hydroxyalkylated alkylene diamine
Tri-hydroxyalkylated alkylene diamine and
Tetra- or totally hydroxyalkylated alkylene diamine In the resulting esters, the alkylene radicals may contain from 2 to 6 carbon atoms and the hydroxyalkyl groups 2 to 8 carbon atoms. The esterifying alkyl carboxylic acid groups may contain no more than 4 carbon atoms. The esterification need not be complete but may be partial.

The diamines listed were by way of example and are not to be construed as limiting. Thus it is within the scope of this invention to employ the acid salts and quaternary ammonium salts of esters of partially or totally hydroxyalkylated polyethylene polyamines and other polyalkylene polyamines.

The useable esters are those of hydroxyalkylated polyamines which are characterized by the fact that the hydroxy alkyl groups contain from 2 to 8 carbon atoms, that the alkylene groups connecting nitrogen atoms in the polyamines shall contain from 2 to 6 carbon atoms, and that the polyamines shall contain no more than 5 amine nitrogen atoms.

It is to be understood that the hydroxyalkyl groups within a given compound need not be alike.

The esters of the quaternary ammonium compounds resulting from the reaction of the hydroxyalkylated polyamines with alkyl or alkyl aryl halides or salts may be employed for the purposes of this invention. This is also true of the esters of the acid salts resulting from reacting the hydroxyalkylated polyamines with acids.

It has been discovered in the course of experimentation with materials of the type described above that acid salts and quaternary ammonium salts of certain esters having short chain substituent groups, particularly some of those derived from partially hydroxyalkylated polyamines tend to cause puffing or the formation of blowholes during extrusion or molding. The permissible chain length is dependent on the degree of substitution in a complex manner. In general, the shortest acceptable chain length is increased as the degree of substitution is decreased. The situation is adequately covered if only those esters are used which have a vapor pressure less than 760 mm. at 225° C. If more volatile compounds are used, gassing during extrusion or molding becomes objectionable. While additives having the above described tendency to gas are obviously undesirable in compositions which are to be handled at high temperatures, such materials can be used to make up a minor proportion of the total additive when used in company with preferred additives.

By incorporating any of the above mentioned additives or mixtures thereof in polystyrene or other resinous polymers the destaticizing properties are attained without incurring any of the undesirable features enumerated above. The quantity of additive employed is between 1 and 7% by weight based on the total product and preferably between 2 and 6%. The upper limit is a matter of choice dictated by considerations of economy and is not critical.

For example, 10% or more may be used and the desired destaticizing result attained, although at higher concentrations there is danger of affecting physical properties adversely.

Be it observed that it will often be advantageous to prepare a master batch of resin with incorporated additive said master batch containing as much as 50% additive material which is far more additive than is recommended for use in molding operations, and being later cut back by extrusion or by being otherwise blended with untreated resin. Such a concentrate may well be sold, particularly in the "clear" or "natural" color for blending with untreated resin of various colors or of its own color. For preparing such master batches, the methods of Examples 12 and 14 are preferred.

By way of illustration, there are given hereinafter a number of examples wherein the additive, quantity of additive and the resinous polymer employed are varied. Since hundreds of combinations are possible it becomes impractical to show more than a few typical compositions with additives so selected from the described group as to show operability of the group as a whole and therefore such examples shall not be regarded as limiting in any sense.

Where it is desired to incorporate pigment in the plastic as well as to render it anti-static, the processes of Examples 1 and 2 are preferred. This procedure is claimed in our copending application entitled "Process for Making Plastic Compositions," Serial Number 532,132, filed September 2, 1955, now abandoned.

In carrying out this last referred to process, the additive is dissolved in a solvent which is a non-solvent for the plastics employed. The solution and plastic in comminuted form are then mixed together. The solvent is then removed so as to deposit the additive over the plastic particles.

In accordance with a particular example of this last mentioned procedure, from 0.1 to 0.7 pound of the additive is dissolved in one pound of isopropyl alcohol. Sufficient comminuted resinous polymer to make a total of ten pounds of additive plus polymer is mixed with the solution. The alcohol is then evaporated in an exhaust oven at 65° C. for 36 hours with occasional agitation, so as to leave the polymer granules uniformly coated with said additive.

The coated material is then fed through a Windsor type RC–65 twinscrew extruder equipped with a series of 1/8" square orifices. The die and barrel are maintained at a suitable temperature for the particular polymer, such as 400° F. for polystyrene. The extruder material may then be chopped up into molding granules.

The molding granules may then be injection molded, as for example on a Reed-Prentice 8-ounce injection molding press with a heater temperature of 550° F. for polystyrene. For other polymers conventional molding temperatures prescribed by the polymer supplier may be employed.

As a test of the effectiveness of the additive the resulting articles may be promptly sprayed with fine bentonite dust by means of a hand sprayer. The dust will collect in patterns on charged areas. Additional moldings may be set aside and observed periodically for several weeks. Using a Keithley electrostatic voltmeter, the potential may be measured between the molding and ground immediately after withdrawal from the mold.

As a control means identical articles may be molded from the same polymer not using the additive.

*Example 1*

The foregoing procedure was carried out using the following composition:

0.6 pound of diacetic acid ester of totally hydroxypropylated ethylene diammonium diacetate was worked together in a sigma blade mixer with 9.4 pounds of polystyrene. After 15 minutes the particles were found to be coated with the additive. The coated particles were then put through the extruder, chopped and molded.

The dust test showed the absence of charged areas. The electrostatic voltmeter reading was about one volt.

One control article was sprayed with the bentonite dust immediately after molding and a well defined "fern-like" pattern was immediately apparent. The same control article yielded a 20 volt reading on the electrostatic voltmeter upon removal from the mold. After long term storage another unmodified polystyrene molding showed definite dust patterns whereas the modified polystyrene article showed a few isolated gravity deposited grains.

The molding characteristics of the modified polystyrene were judged to be superior to that of the control or unmodified polystyrene by the molding machine operator on the basis of obviously improved ease of mold release and lower breakage of thin-walled moldings.

*Example 2*

Example 1 was repeated using as the additive 0.6 pound triacetic acid ester of tetra hydroxyoctylated triethylene tetramine hydrochloride and 9.4 pounds of the polystyrene. The results were comparable.

*Example 3*

The procedure of Example 1 was repeated using 9.4 pounds of a so-called high impact polystyrene which was a plastic alloy of 85% polystyrene, 5% polybutadiene, 10% polyacrylonitrile and 0.6 pound of diacetic acid ester of totally hydroxypropylated ethylene dimethyl diammonium dichloride.

The molded product was compared with a control specimen prepared in identical fashion with the exception that the additive was omitted. The two specimens were opaque in appearance. Immediately after molding the treated material showed a charge of one volt whereas the unmodified control showed a charge of nineteen volts.

*Example 4*

The procedure of Example 1 was repeated using 0.6 pound of mono-butyric acid ester of totally hydroxypropylated hexylene diamine tetrahydrobutyrate and 9.4 pounds of polyvinylchloride. Extrusion was carried out with a barrel and die temperature of 390° F. Injection molding was carried out at 400° F. The resulting molded articles were similar in appearance to unmodified polyvinylchloride and exhibited excellent molding and antistatic properties. The electrostatic voltmeter test yielded a reading of approximately one volt whereas untreated polyvinylchloride showed a reading of over twenty volts upon molding.

Example 5

40 grams of diacetic acid ester of totally hydroxyethylated diethylene triammonium triacetate dissolved in 40 grams of water were added to 400 grams of a 30% solids polystyrene emulsion. This mixture was spray-dried and gave a free flowing polystyrene powder containing one part of the additive to three parts of polystyrene. The resultant concentrate was tumbled with 840 grams of a granulated polystyrene. The resultant blend was injection molded under conventional polystyrene molding conditions and yielded destaticized moldings having properties comparable to those produced by the procedures of Example 1.

For the purpose of illustrating the invention, examples have been shown of the application of our invention to plastic alloys of polystyrene, polyethylene, polyvinylchloride and polymethylmethacrylate and their copolymers. We wish it to be understood that the invention likewise may be utilized in treating others such as polyacrylonitrile, polyfluoroethylene, polytrifluoromonochloroethylene, polybutadienes, halogenated polystyrenes, and mixtures and copolymers of these materials.

By "plastic alloy" as used herein, we intend to encompass compositions comprising two or more types of polymeric molecules whether prepared by copolymerization or by intimate mixing.

Mixtures of the various additives may be employed providing the total amount is within the disclosed proportions for a single specie.

While we have disclosed that which is at present considered the best mode for carrying out our invention, we appreciate that it will be obvious to those skilled in the art that various changes and modifications may be made therein without departing from the invention, and it is, therefore, aimed in the appended claims to cover all such changes and modifications as fall within the true spirit and scope of the invention.

What we claim is:

1. A composition of matter comprising a polymer produced by polymerization of an ethylenically unsaturated monomer and containing as a destaticizing agent between 1% and 7% by weight of a salt selected from the group consisting of acid salts and quaternary ammonium salts of an ester formed by esterification of a saturated aliphatic carboxylic acid containing no more than four carbon atoms and a compound selected from the group consisting of hydroxyalkylated alkylene polyamines, with from 2 to 8 carbon atoms in the hydroxyalkyl groups, from 2 to 6 carbon atoms in the alkylene groups connecting the amine nitrogen atoms and with no more than 5 nitrogen atoms in the compound.

2. The composition of claim 1 wherein said salt is diacetic acid ester of totally hydroxypropylated ethylene diammonium diacetate.

3. The composition of claim 1 wherein said salt is diacetic acid ester of totally hydroxypropylated ethylene dimethyl diammonium dichloride.

4. The composition of claim 1 wherein said polymer is polystyrene.

5. The composition of claim 1 wherein said polymer is polyvinylchloride.

6. The composition of claim 1 wherein said polymer is polymethylmethacrylate.

7. The composition of claim 1 wherein said polymer is polyethylene.

8. The composition of claim 1 wherein said polymer is a plastic alloy containing polymers of monomers selected from the group consisting of acrylonitrile, styrene and butadiene.

9. A composition of matter comprising a polymer produced by polymerization of an ethylenically unsaturated monomer and containing as a destaticizing agent between 2% and 6% by weight of a salt selected from the group consisting of acid salts and quaternary ammonium salts of an ester formed by esterification of a saturated aliphatic carboxylic acid containing no more than four carbon atoms and a compound selected from the group consisting of hydroxyalkylated alkylene polyamines, with from 2 to 8 carbon atoms in the hydroxyalkyl groups, from 2 to 6 carbon atoms in the alkylene groups connecting the amine nitrogen atoms and with no more than 5 nitrogen atoms in the compound.

References Cited in the file of this patent

UNITED STATES PATENTS

| | | |
|---|---|---|
| 2,697,118 | Lundsted et al. | Dec. 14, 1954 |
| 2,874,138 | Jackson | Feb. 17, 1959 |

UNITED STATES PATENT OFFICE
CERTIFICATE OF CORRECTION

Patent No. 3,051,663                        August 28, 1962

Myron A. Coler et al.

It is hereby certified that error appears in the above numbered patent requiring correction and that the said Letters Patent should read as corrected below.

Column 3, lines 38 and 39, for "methods of Examples 12 and 14 are" read -- method of Example 5 is --; lines 49 and 50, for "of Examples 1 and 2" read -- described below --.

Signed and sealed this 19th day of February 1963.

(SEAL)
Attest:

ESTON G. JOHNSON                              DAVID L. LADD
Attesting Officer                                   Commissioner of Patents